(12) United States Patent
Yang

(10) Patent No.: US 6,547,487 B2
(45) Date of Patent: Apr. 15, 2003

(54) WAVE DISSIPATING BLOCKS FOR CONSTRUCTING A SEAWALL

(76) Inventor: Won-Hoi Yang, Ma-1106, Sambo-Apt. 725, Bangbae-dong, Seochu-gu, Seoul (KR)

( * ) Notice: Subject to any disclaimer, the term of this patent is extended or adjusted under 35 U.S.C. 154(b) by 0 days.

(21) Appl. No.: 09/941,354

(22) Filed: Aug. 29, 2001

(65) Prior Publication Data

US 2002/0025231 A1 Feb. 28, 2002

(30) Foreign Application Priority Data

Aug. 30, 2000 (KR) ..................... 2000-0050614

(51) Int. Cl.$^7$ .............. E02B 3/14; E04B 2/08
(52) U.S. Cl. ............ 405/16; 405/15; 405/17; 405/18; 405/21; 405/302.6; 52/589.1; 52/591.1; 52/603; 404/34; 404/42; D25/113
(58) Field of Search ............ 405/15–21, 30, 405/31, 302.6; 52/582.1, 589.1, 591.1, 591.2, 603–606; 404/34, 39–42; D25/113–115, 118

(56) References Cited

U.S. PATENT DOCUMENTS

| | | | | |
|---|---|---|---|---|
| 3,148,477 A | * | 9/1964 | Bjorn et al. | 52/591.2 |
| 3,557,669 A | * | 1/1971 | Fenton | 404/42 |
| 4,175,888 A | * | 11/1979 | Ijima | 405/31 |
| 4,730,953 A | * | 3/1988 | Tarko | 405/45 |
| 5,087,150 A | * | 2/1992 | McCareary | 405/16 X |
| 5,108,222 A | * | 4/1992 | Jansson et al. | 405/20 |
| 5,383,314 A | * | 1/1995 | Rothberg | 52/169.5 |
| 5,457,926 A | * | 10/1995 | Jensen | 52/604 |
| 5,489,462 A | * | 2/1996 | Sieber | 405/38 X |
| 5,556,230 A | * | 9/1996 | Turk et al. | 405/29 |
| 6,050,044 A | * | 4/2000 | McIntosh | 52/591.1 |
| 6,050,873 A | * | 4/2000 | Reisman | 52/604 X |

FOREIGN PATENT DOCUMENTS

| | | | | |
|---|---|---|---|---|
| EP | 143752 | * | 6/1985 | 405/16 |
| GB | 2211533 | * | 7/1989 | 405/16 |
| JP | 4366215 | * | 12/1992 | 405/16 |

* cited by examiner

*Primary Examiner*—Jong-Suk Lee
(74) *Attorney, Agent, or Firm*—Howard & Howard

(57) ABSTRACT

A block assembly for constructing a seawall and dissipating waves. The block assembly includes a block comprising a front wall, a left side part and a right side part. The left and right side parts include stepped surfaces and a plurality of round shaped projection parts are closely disposed on the front wall. The block further includes two connecting walls having male protrusions and female recesses formed on upper and lower surfaces thereof. A vertical partition wall extends from a rear center of the front wall and includes a male protrusion on the upper surface thereof and a female recesses on the lower surface thereof

6 Claims, 3 Drawing Sheets

WAVE DISSIPATING BLOCKS FOR CONSTRUCTING A SEAWALL

RELATED APPLICATIONS

This application claims priority to Korean Patent Application No. 2000-50614, filed on Aug. 30, 2000.

FIELD OF THE INVENTION

The present invention relates to a block assembly for constructing a seawall and dissipating waves.

BACKGROUND OF THE INVENTION

Generally, natural stones and pebbles having a uniform size have been used to form a breakwater or seawall for protecting the concerned structure, thereof. Such conventional seawalls using natural stones and pebbles as covering materials have been easily and cheaply constructed. However, gathering and using natural stones, causes environmental damage. There are many needs to provide seawalls or breakwaters with natural beauty. Therefore, artificial blocks are preferably used, particularly for breakwaters and seawalls facing comparatively lower wave power, and having satisfactory characteristics of water properties, to secure leisure space, and to further strengthen natural protection as well as for effectively dissipating waves.

SUMMARY OF THE INVENTION AND ADVANTAGES

The present invention provides a block assembly for constructing a seawall and dissipating waves. The block assembly includes a block having a front wall, a left side part and a right side part. The block has stepped surfaces on the left side part and the right side part. A plurality of round shaped projection parts are closely disposed on the front wall. Two connecting walls each having a male protrusion and a female recess are formed on upper and lower surfaces of the connecting walls. The connecting walls extend from the front wall of the block. A vertical partition wall extends from the front wall of the block. The vertical partition wall includes a male protrusion on an upper surface thereof and a female recess on a lower surface thereof, the vertical partition extending from the front wall of the block.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
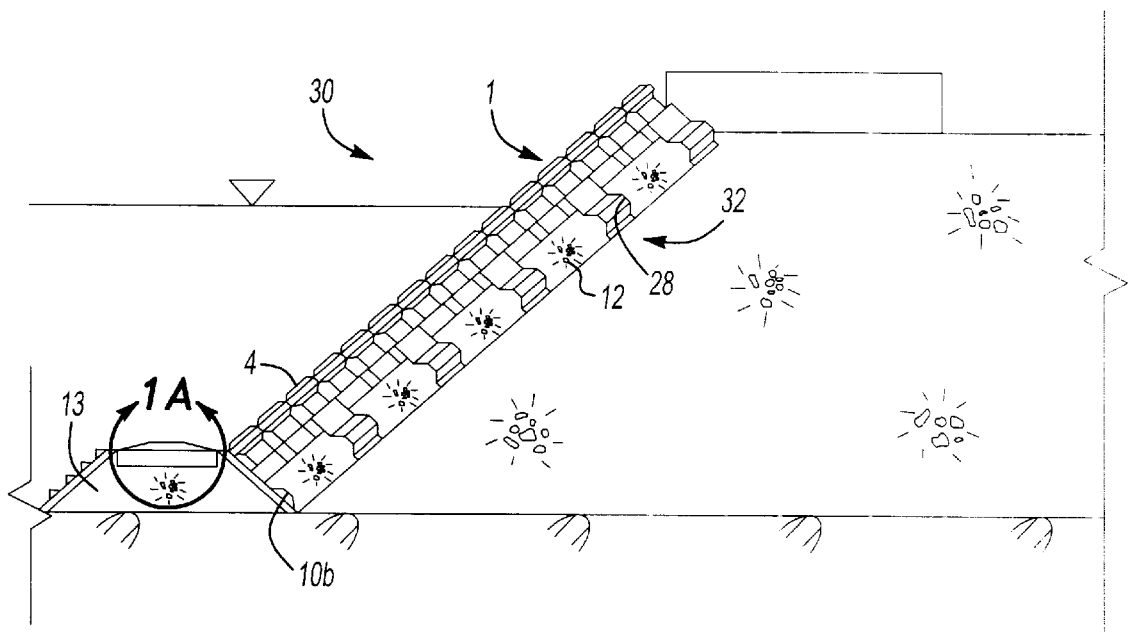
FIG. 1 is a cross sectional view of a seawall comprising several blocks of the present invention and installed on an inclined surface of the embankment.
Figure 1A:
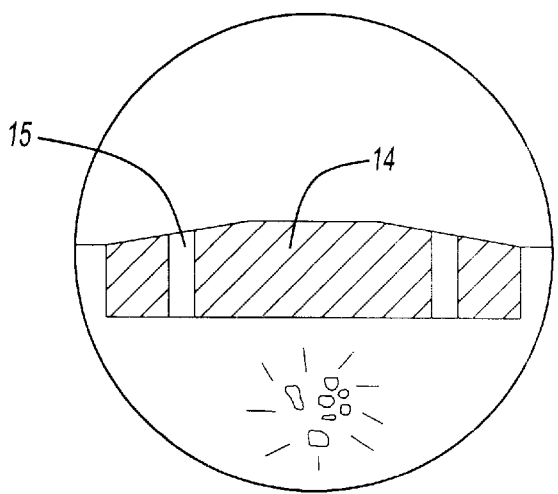
FIG. 1A is a blow-up view of a portion of FIG. 1.
Figure 2:
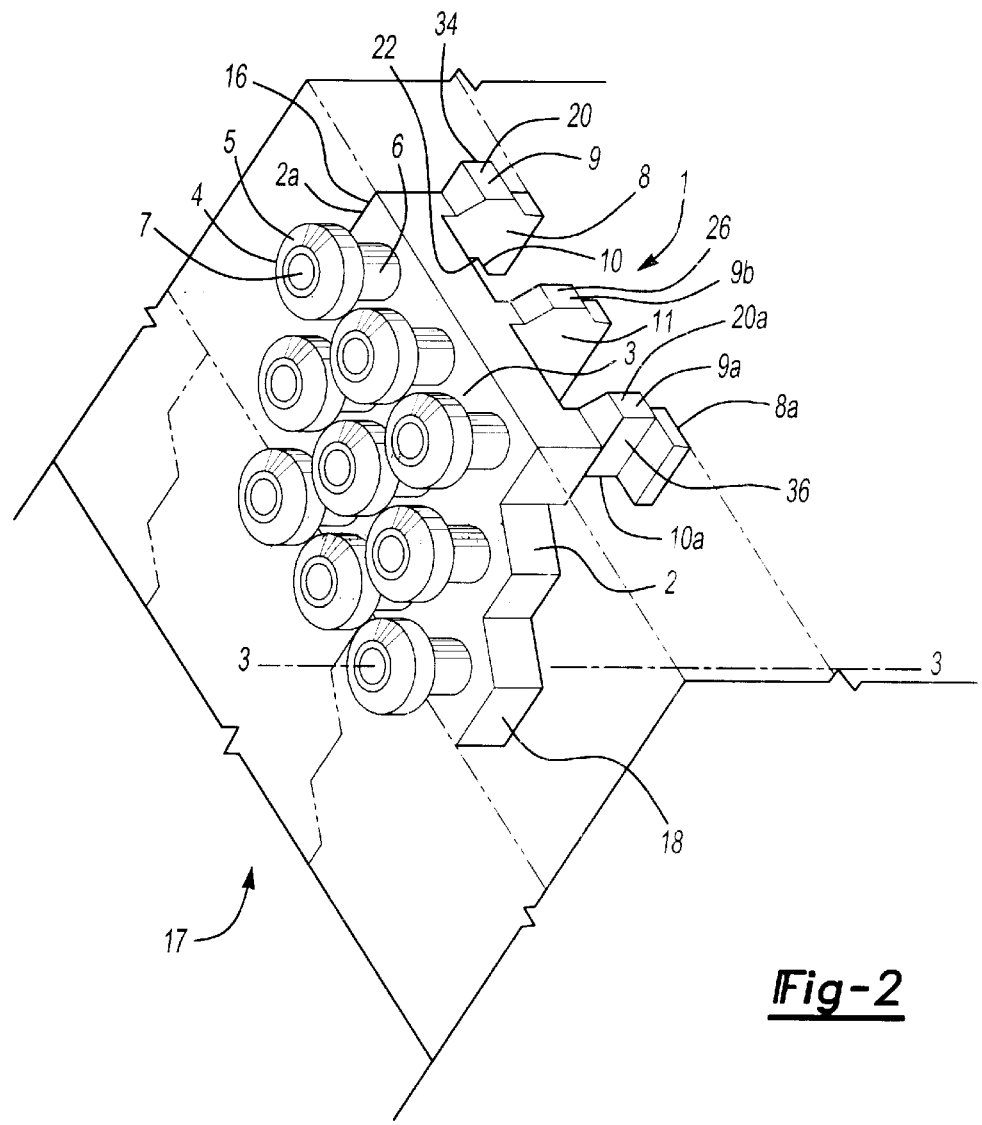
FIG. 2 is a perspective view of the block of the present invention.
Figure 3:
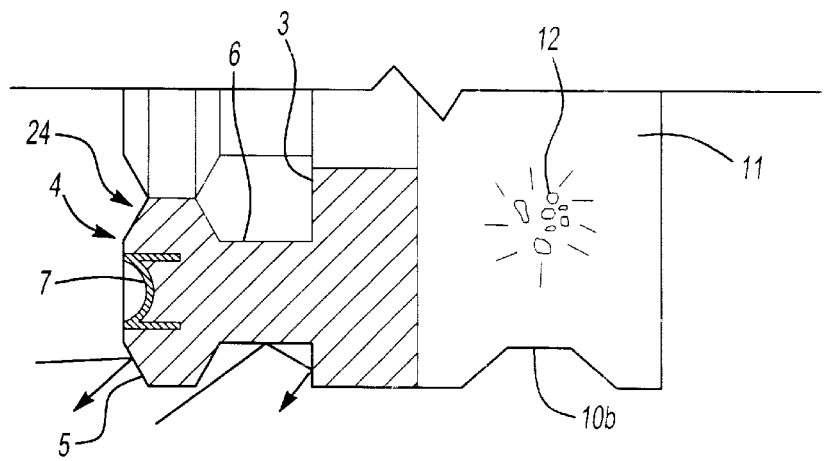
FIG. 3 is a longitudinal cross sectional view taken along line 3—3 in FIG. 2.
Figure 4:
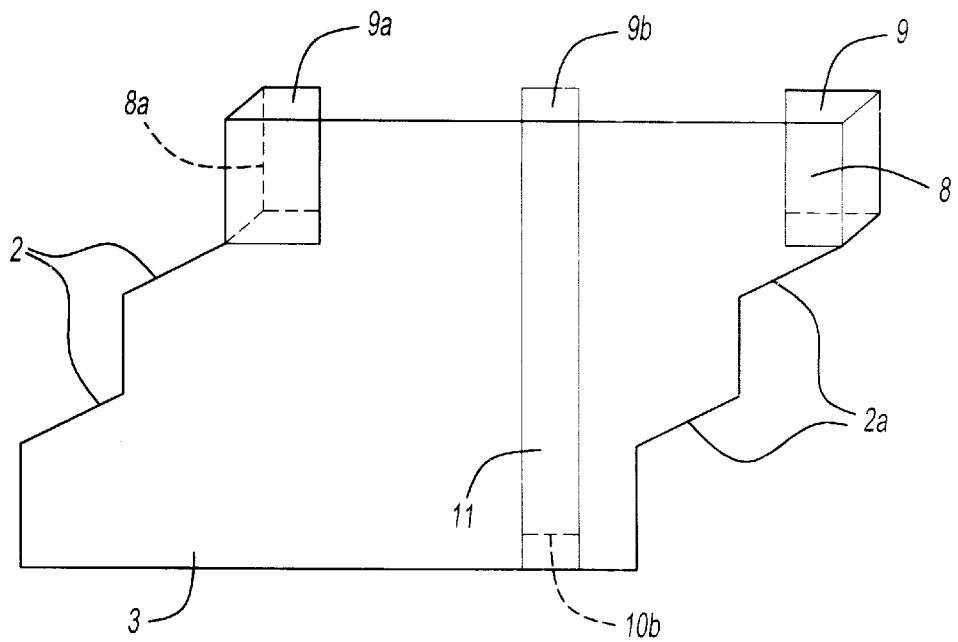
FIG. 4 is a rear view of the block of the present invention with hidden lines showing recesses.

Referring to the Figures, wherein like numerals indicate like or corresponding parts throughout the several views, a block assembly 17 for constructing a seawall 30 and dissipating waves is described in detail hereinafter in conjunction with the attached drawings in FIG. 1 to FIG. 5.

The block assembly 17 includes a block 1 for constructing a seawall 30 along an embankment 32. In the preferred embodiment, the block 1 comprises a front wall 3 being provided with stepped surfaces 2, 2a on the left side part 16 and the right side part 18, or also referred to as the left side 16 and right side 18. A plurality of round shaped projection parts 4 (there are nine round shaped projection ports in the attached drawings) are disposed in a zigzag fashion and closely positioned relative to one another on the front wall 3. Two connecting walls 8, 8a are disposed on the block 1 and extend rearwardly from the block 1. The connecting walls 8, 8a have male protrusions 9, 9a and female recesses 10, 10a2 formed on the upper and lower surfaces 20,20a, 22,22a thereof. A vertical partition wall 11 is also disposed on the block 1 and extends rearwardly from the block 1 between the connecting walls 8, 8a such that unobstructed channels are formed between each of the connecting walls 8, 8a and the vertical partition wall 11. The vertical partition wall 11 has a male protrusion 9b on an upper surface 26 thereof and a female recess 10b on a lower surface 28 thereof. The vertical partition wall 11 is formed in the rear center of the front wall 3. The male protrusions 9, 9a of the connecting walls 8, 8a and the male protrusion 9b of the vertical partition wall 11 protrude upwardly beyond the front wall 3 of the block 1 to facilitate assembly of adjacent block assemblies 17.

A tip portion 24 of the round shaped projection parts 4 has a large diameter head part 5 and a small diameter connecting stem 6 which connects the head part 5 and the front wall 3. In the center of the head part 5, a hemisphere part 7 that is made from extruded plastic is shaped with the block 1 and collapsed to create a hemispherical shape. When forming the round shaped projection parts 4, space between them should be as narrow as possible.

The block 1 of the present invention is used to construct the seawall 30. The blocks 1 are stacked on top of each other along the embankment 32 and locked by way of the male protrusions 9,9a,9b and the female recess 10b. The blocks 1 are placed in rows in side by side fashion with the blocks 1 in each row being staggered relative to blocks 1 in adjacent upper and lower rows. The blocks 1 include a side protrusion 34 on one of the connecting walls 8,8a and a side recess 36 on the opposing connecting wall 8,8a. The side recess 36 is for receiving the side protrusion 34 of adjacent blocks 1. In addition, at least one of the male protrusions 9,9a,9b engage the female recess 10b of the vertical partition wall 11. The male protrusion 9,9a,9b that engages the female recess 10b is dependent on the configuration of the blocks 1 as assembled. In other words, not all of the male protrusions 9,9a,9b will be engaging the female recess 10b.

Stones and pebbles 12 are shown along the embankment in FIG. 1. The stones and pebbles 12 fill unobstructed channels between the vertical partition wall 11 and the connecting walls 8,8a. Accordingly, the seawall 30 is to be constructed on an inclined surface of the embankment 32 on top of the stones and pebbles 12. When stacking the blocks 1 in the lower level thereof to form the seawall 30, a supporting hill 13 having a concrete cap 14 with communicating holes 15 is provided to prevent sliding of the blocks 1.

Figure 5:
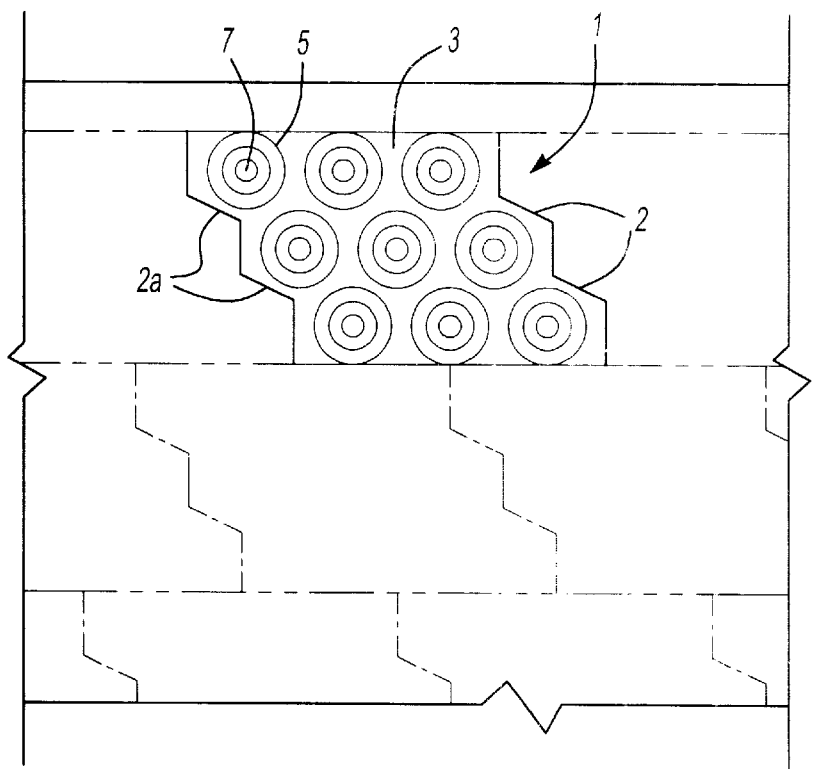
FIG. 5 is a front view of several stacked blocks of the present invention.

As stated above, by means of stacking the blocks 1 as in FIG. 5, on the inclined surface of the embankment 32, and by means of filling stones and pebbles 12 in the space between the vertical partition wall 11 and the connecting wall 8, 8a, waves rushed over the round shaped projection parts 4, are reflected, dissipated and decreased in power. The waves crash on the front wall 3 and collide with the head portion 5 of the round shaped projection parts 4 and split into spaces between the round shaped projection parts 4 which have the function of a reservoir among the projection parts 4.

The hemisphere part 7 that is fixed in the center portion of the tipped head 5 of the round shaped projection parts 4 may be made from extruded, color-designated, synthetic resin so that the present invention may provide a manmade seawall that is harmonized with the surrounding landscape without any natural damage by providing beautifully structured, inclined surfaces with the seawall.

Obviously, many modifications and variations of the present invention are possible in light of the above teachings. The invention may be practiced otherwise than as specifically described within the scope of the appended claims.

What is claimed is:

1. A wave dissipating block assembly for constructing a seawall and dissipating waves, said assembly comprising;
    a block having a front wall, a left side and a right side, said block having stepped surfaces on said left side and said right side,
    a plurality of round shaped projection parts disposed on said front wall,
    two connecting walls disposed on said block and extending rearwardly from said block, each of said connecting walls having a male protrusion and a female recess,
    a vertical partition wall having a male protrusion and a female recess. said vertical partition wall being disposed on said block and extending rearwardly from said block between said connecting walls, and
    unobstructed channels extending across said block and defined between each of said connecting walls and said vertical partition wall such that stones and pebbles can be filled in said unobstructed channels between said connecting walls and said vertical partition wall to secure the seawall.

2. A block assembly as set faith in claim 1 wherein said male protrusions of said connecting walls and said male protrusion of said vertical partition wall protrude upwardly beyond said front wall of said block for engaging adjacent block assemblies.

3. A block assembly as set forth in claim 2 wherein said plurality of round shaped projection parts each comprise a connecting stem fixed to said front wall and a head part spaced from said front wall and fixed to said connecting stem.

4. A block assembly as set forth in claim 2 wherein said connecting walls further include at least one of a side recess and a side protrusion proximate said male protrusions of said connecting walls for engaging adjacent block assemblies.

5. A block assembly for constructing a seawall and dissipating waves, said assembly comprising;
    a block having a front wall, a left side and a right side, said block having stepped surfaces on said left side and said right side,
    a plurality of round shaped projection parts closely disposed on said front wall,
    two connecting walls each having a male protrusion and a female recess formed on upper and lower surfaces of said connecting walls and said connecting walls extending rearwardly from said front wall of said block,
    a vertical partition wall having a male protrusion on an upper surface thereof and a female recess on a lower surface thereof, said vertical partition wall extending rearwardly from said front wall of said block, and
    a supporting hill having a concrete cap and defining a communication hole, said supporting hill being positioned at a lower level of said block for supporting the block assembly.

6. A block assembly for constructing a seawall and dissipating waves, said assembly comprising;
    a block having a front wall, a left side and a right side, said block having stepped surfaces on said left side and said right side,
    a plurality of round shaped projection parts closely disposed on said front wall wherein said plurality of round shaped projection parts include a head part and a hemisphere part fixed in a center portion of said head part,
    two connecting walls each having a male protrusion and a female recess formed on upper end lower surfaces of said connecting walls and said connecting walls extending rearwardly from said front wall of said block, and
    a vertical partition wall having a male protrusion on an upper surface thereof and
    a female recess on a lower surface thereof, said vertical partition wall extending rearwardly from said front wall of said block.

* * * * *